United States Patent
Kim et al.

(10) Patent No.: US 8,507,057 B2
(45) Date of Patent: Aug. 13, 2013

(54) HEAT-SHRINKABLE POLYESTER FILM AND PREPARATION METHOD THEREOF

(75) Inventors: Seong-Do Kim, Suwon-si (KR); Taehoung Jeong, Suwon-si (KR); Tae-Byoung Oh, Suwon-si (KR)

(73) Assignee: SKC Co., Ltd, Suwon-si (KR)

( * ) Notice: Subject to any disclaimer, the term of this patent is extended or adjusted under 35 U.S.C. 154(b) by 249 days.

(21) Appl. No.: 13/133,003

(22) PCT Filed: Mar. 19, 2009

(86) PCT No.: PCT/KR2009/001403
§ 371 (c)(1), (2), (4) Date: Jun. 6, 2011

(87) PCT Pub. No.: WO2010/107147
PCT Pub. Date: Sep. 23, 2010

(65) Prior Publication Data
US 2011/0237759 A1    Sep. 29, 2011

(51) Int. Cl.
| | |
|---|---|
| B32B 27/36 | (2006.01) |
| B29C 55/02 | (2006.01) |
| C08G 63/127 | (2006.01) |
| C08G 63/13 | (2006.01) |
| C08G 63/16 | (2006.01) |
| C08G 63/181 | (2006.01) |
| C08G 63/185 | (2006.01) |
| C08G 63/187 | (2006.01) |
| C08G 63/189 | (2006.01) |
| C08G 63/123 | (2006.01) |

(52) U.S. Cl.
USPC .......... 428/34.9; 428/480; 428/910; 528/302; 528/305; 528/308; 528/308.6; 528/308.7; 264/288.4

(58) Field of Classification Search
None
See application file for complete search history.

(56) References Cited

U.S. PATENT DOCUMENTS

| | | | | |
|---|---|---|---|---|
| 6,231,958 | B1 * | 5/2001 | Kim et al. | 528/272 |
| 6,818,312 | B2 * | 11/2004 | Lee et al. | 428/447 |
| 6,939,616 | B2 * | 9/2005 | Hayakawa et al. | 428/480 |
| 7,018,689 | B2 * | 3/2006 | Lee et al. | 428/34.9 |
| 2007/0248777 | A1 * | 10/2007 | Lee et al. | 428/34.1 |
| 2008/0284057 | A1 | 11/2008 | Hayakawa et al. | |

FOREIGN PATENT DOCUMENTS

| | | |
|---|---|---|
| KR | 10-0356999 B1 | 10/2002 |
| KR | 2003-0036104 A | 5/2003 |
| KR | 10-2005-0067627 A | 7/2005 |
| KR | 10-2005-0074733 A | 7/2005 |
| KR | 10-2005-0089094 A | 9/2005 |
| KR | 10-0540716 B1 | 12/2005 |
| KR | 10-0786011 B1 | 12/2007 |
| KR | 10-2009-0030554 A | 3/2009 |

* cited by examiner

*Primary Examiner* — Vivian Chen
(74) *Attorney, Agent, or Firm* — Sughrue Mion, PLLC

(57) ABSTRACT

A heat-shrinkable polyester film having a thermal shrinkage ratio of 15% or more in the longitudinal direction when treated at 100° C. for 10 seconds, a tensile strength at rupture in the longitudinal direction of 7 kgf/mm² or more, and a difference between elongations at the hardening and yield points in the longitudinal direction of 15% or more exhibits superior properties, such as high tensile strength and crack-resistance in the longitudinal direction, suitable for labeling or shrink-wrapping containers.

10 Claims, 4 Drawing Sheets

HEAT-SHRINKABLE POLYESTER FILM AND PREPARATION METHOD THEREOF

CROSS REFERENCE TO RELATED APPLICATIONS

This application is a National Stage of International Application No. PCT/KR2009/001403 filed Mar. 19, 2009, the contents of all of which are incorporated herein by reference in their entirety.

FIELD OF THE INVENTION

The present invention is directed to a heat-shrinkable polyester film having high tensile strength and crack-resistance along the longitudinal direction, the main shrinking direction, and a method for preparing the polyester film.

BACKGROUND OF THE INVENTION

Heat-shrinkable films have been extensively used, e.g., for labeling bottles, batteries or electrolytic condensers, and for wrapping containers and other products. Such heat-shrinkable films are formed of polyvinyl chloride, polystyrene, polypropylene or polyester, and they are required to have good sealing and shrinking properties and good driving and crack-resistance properties along the longitudinal direction as well as good heat resistance, chemical resistance, weatherability and printability.

However, conventional heat-shrinkable polyester films for labeling or wrapping which are prepared by primarily drawing undrawn sheets in the transverse direction tend to undergo shrinkage in the drawn transverse direction, thereby exhibiting poor mechanical properties, i.e., low tensile strength and reduced driving properties (frequent film cuts), in the longitudinal direction, especially during withdrawing or post-processing.

In addition, conventional heat-shrinkable polyester films have the problem that cracks are often generated after thermally shrunk for labeling or wrapping due to their high degree of crystallization.

A typical container wrapping or labeling process using a film drawn in the transverse direction is shown in FIG. 1. Referring to FIG. 1, a predetermined pattern is printed on a film, the printed film is slit into a specified width, and a sleeve seaming process is conducted to obtain a sleeve form, which is wound to prepare a sleeve roll. The sleeve sheet is cut to a predetermined length and the cut sleeve is placed around a target, and subjected to heat-shrinking in a shrinking tunnel. Such a conventional process, however, has various problems in that it is very complicated and it also suffers from low productivity due to discontinuity between before and after the sleeve roll preparation process.

In order to overcome the above-mentioned problems, Japanese Laid-open Patent Publication No. 1998-77335 discloses a method for preparing a film by copolymerizing using a naphthalenedicarboxylic acid component; and Japanese Laid-open Patent Publication Nos. 1988-139725, 1994-122152, 1995-53737, 1995-216107 and 1995-216109 disclose that the shrinkage rate of a film can be controlled by blending a polyethylene terephthalate or polybuthylene terephthalate in a particular ratio, or by copolymerizing a dicarboxylic acid component such as terephthalic acid and isophthalic acid with a diol component such as ethylene glycol and 1,4-cyclohexanedimethanol. However, these methods still do not provide satisfactory improvements.

SUMMARY OF THE INVENTION

Accordingly, it is an object of the present invention to provide a heat-shrinkable polyester film which can be easily labeled on, or wrapped around a container without complicated post-processing such as seaming, and has improved mechanical properties in the longitudinal direction as well as improved crack-resistance even after thermally shrunk for labeling or wrapping.

In accordance with the present invention, there is provided a heat-shrinkable polyester film having a thermal shrinkage ratio of 15% or more in the longitudinal direction when treated at 100° C. for 10 seconds, a tensile strength at rupture in the longitudinal direction of 7 kgf/mm$^2$ or more, and a difference between elongations (%) at the hardening and yield points in the longitudinal direction of 15% or more.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE INVENTION

Figure 1:
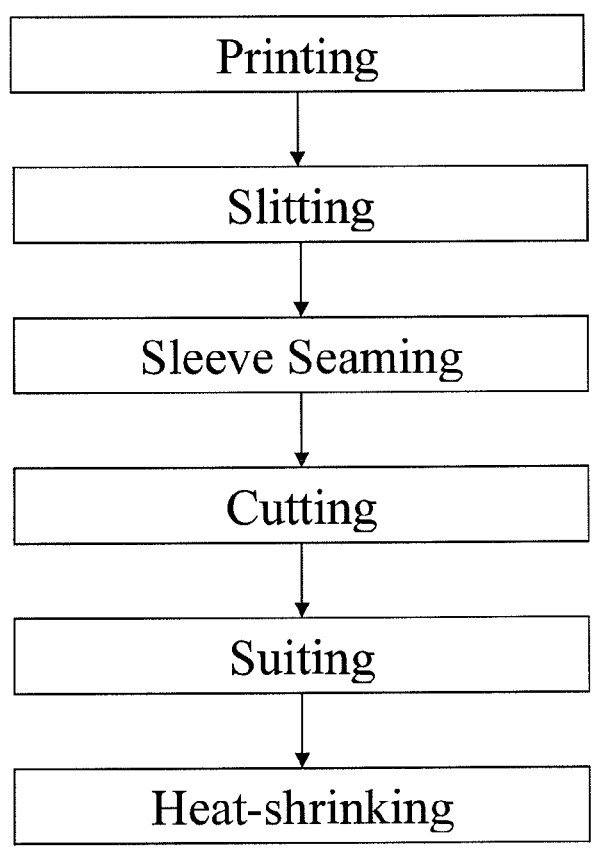
FIG. 1: a flow chart showing a post-processing of a transversely directional shrinkable film according to the conventional method.
Figure 2:
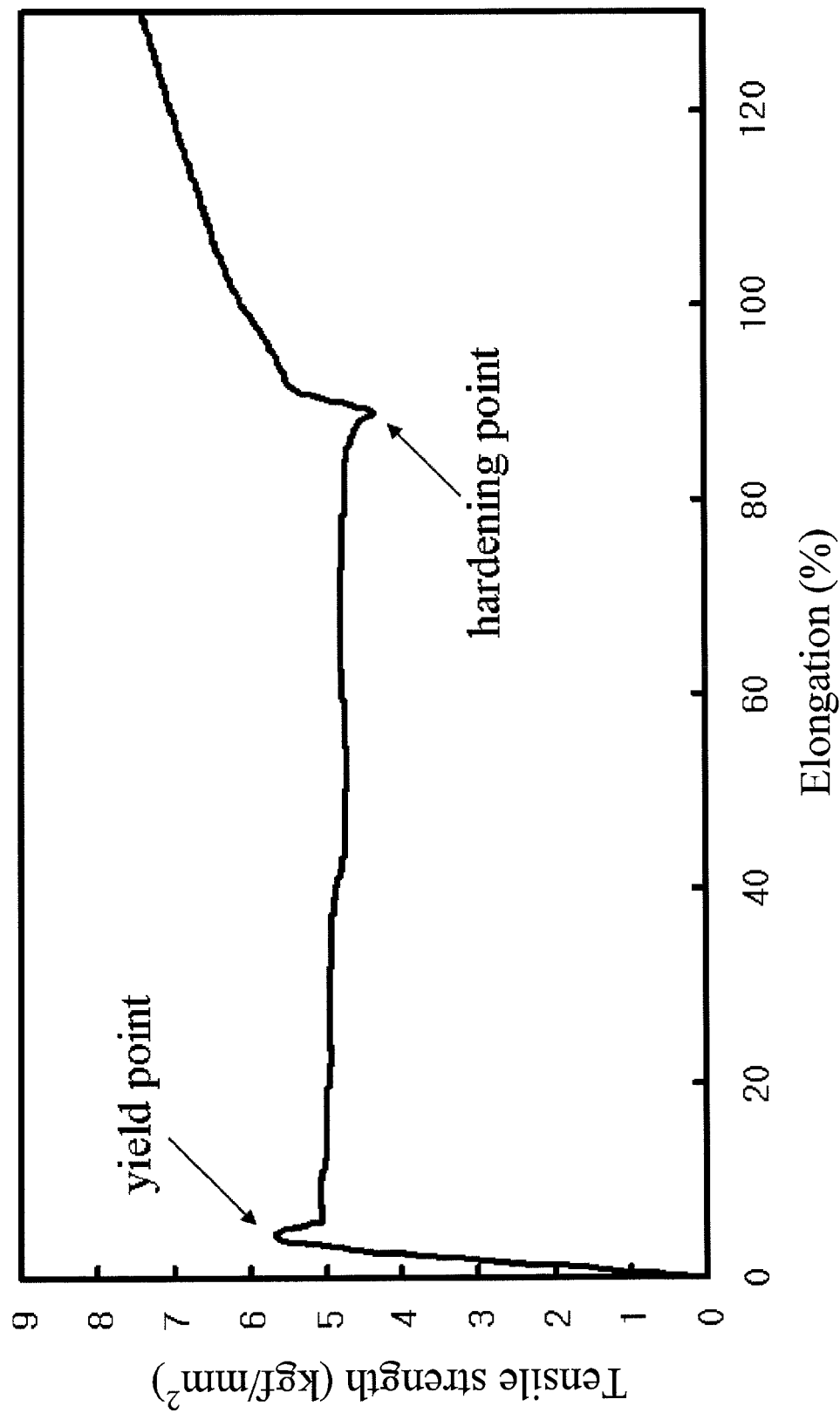
FIG. 2: a stress-strain curve showing the degree of elongation at hardening and the yield point of the film obtained in Example 3.

The heat-shrinkable polyester film in accordance with the present invention is characterized by having a tensile strength at rupture in the longitudinal direction of 7 kgf/mm$^2$ or more, and the difference between elongations at the hardening and yield points in the longitudinal direction of 15% or more.

In a stress-strain curve on a tension test, a stressed specimen initially extends in proportion to the increase in the load, and the term "yield point" means the load (the level of stress) at which the specimen deforms permanently in the early stage regardless of the load increase thereafter. In addition, the term "hardening point" represents the load (the level of stress) at which the stress-strain curve starts to take a positive tangent line after the yield point.

The present inventors have found that when, in a tension test on a heat-shrinkable polyester film, the difference between the yield point and the hardening point becomes larger, the crack-resistance of the film after thermally shrunk for labeling or wrapping becomes enhanced. In particular, it has been confirmed that in case of the film having such difference of 15% or more, the crack-resistance becomes greatly enhanced.

The heat-shrinkable polyester film in accordance with the present invention is also characterized by having a thermal shrinkage ratio of 15% or more in the longitudinal direction when treated in 100° C. water for 10 seconds.

When the thermal shrinkage ratio is lower than 15%, the polyester film cannot be used for labeling of curved containers. Further, when the tensile strength at rupture in the longitudinal direction is lower than 7 kgf/mm$^2$, frequent film cuts occur during post-processing due to low mechanical strength of the film.

The inventive film may be a uni-directionally shrinkable film which is drawn in the longitudinal direction at a total drawing ratio of 1.2 to 7.

The inventive heat-shrinkable polyester film may be composed of a polyester resin which comprises 60 to 97% by mole of ethylene terephthalate repeating unit, and 3 to 40% by mole of a repeating unit obtained by copolymerization of a component such as terephthalic acid, dimethyl terephthalate, naphthalenedicarboxylic acid and a mixture thereof with a branched alkylene glycol component having a carbon number of 3 or more. When the repeating unit is comprised in such amount, the film exhibits a satisfactory tension in the longitudinal direction and crystallization degree, leading to good crack-occurence ratio and heat-resistance as well as preventing of hole generation in the label during heating.

The polyester resin used in the inventive heat-shrinkable polyester film may further comprises 20% or less by mole, preferably 5 to 20% by mole, of a repeating unit obtained by copolymerization of a component such as terephthalic acid, dimethyl terephthalate, naphthalenedicarboxylic acid and a mixture thereof with a linear alkylene glycol component having a carbon number of 3 or more.

The branched alkylene glycol component may be 1,2-octanediol, 1,3-octanediol, 2,3-butanediol, 1,3-butanediol, 2,2-dimethyl-1,3-propanediol, 2-butyl-2-ethyl-1,3-propanediol, 2,2-diethyl-1,5-petanediol, 2,4-diethyl-1,5-pentanediol, 3-methyl-1,5-pentanediol, 1,1-dimethyl-1,5-pentanediol and a mixture thereof. The linear alkylene glycol component may be 1,3-propanediol, 1,4-butanediol, 1,5-pentanediol and a mixture thereof.

The polyester film used in the present invention may contain additives such as polymerization catalysts, dispersing agents, antistatic agents, antiblocking agents and lubricants, in amounts that would not adversely affect the film properties.

The inventive heat-shrinkable polyester film is prepared by a method comprising the steps of: melt-extruding a polyester resin at 200 to 300° C.; casting the extruded resin with cooling, to produce an undrawn sheet; and drawing the undrawn sheet in the longitudinal direction at a total drawing ratio of 1.2 to 7.

In the inventive method, the drawing may conducted by various method, e.g., adjusting the peripheral velocities of rolls, adjusting the distance between longitudinal directional glibs of a tenter, using a gas pressure, etc. Among such methods, it is most preferable to draw in the longitudinal direction by controlling the difference of the peripheral velocities of a plurality of rolls, which may be conducted in one stage or two or more stages. For drawing in 2 or more stages, the rear drawing roll is required to have higher peripheral velocity than the front drawing roll. Preferably, the peripheral velocity ratio of the rear drawing roll to the front drawing roll is 1.1 to 6.5.

The inventive method is easy to control the thickness of the film in the transverse direction and does not need an excessive drawing or heat-treatment which is required in a conventional method for drawing in the transverse direction. The film prepared by the inventive method has improved crack-resistance due to a difference between elongations at the hardening and yield points in the longitudinal direction of 15% or more, and has high tensile strength at rupture in the longitudinal direction.

The inventive film can be prepared by drawing a sheet in the longitudinal direction at a total drawing ratio of 1.2 to 7, preferably 1.5 to 5. Further, the sheet may also be drawn in the transverse direction at a drawing ratio of 1 to 1.5, preferably 1 to 1.2.

The inventive film preferably has a thickness of 12 to 125 μm. When the film has such thickness, the film exhibits superior properties suitable for labeling or shrink-wrapping containers, e.g., good shrinking property, printability, weatherability, chemical resistance, crack-resistance, rupture-resistance, etc.

Figure 3:
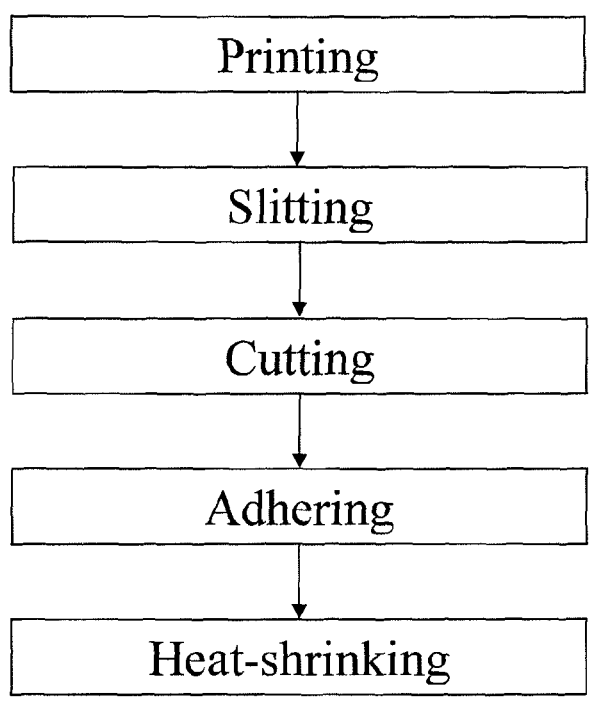
FIG. 3: a flow chart showing a post-processing of the inventive film.

Because the primary shrinkage direction of the inventive film is the longitudinal direction, post-processing such as wrapping or labeling can be simplified, as shown in FIG. 3. Referring to FIG. 3, the inventive film is subjected to: printing, slitting into a specified length, cutting the slit film to suit to a target, and heat-shrinking. Therefore, the post-processing of the inventive film does not require a seaming process for preparing a sleeve roll, and can be conducted simply and continuously, which markedly improves the productivity over the post-processing of a transversely directional shrinkable film.

The following examples are intended to illustrate the present invention, however these examples are not to be construed to limit the scope of the invention.

EXAMPLES

The following examples are now given for the purpose of illustration only, and are not intended to limit the scope of the invention.

Preparation Example 1

Preparation of 2,2-dimethyl-1,3-propanediol copolymerized polyester(polymer A)

100 parts by mole of dimethyl terephthalate, 130 parts by mole of ethylene glycol and 30 parts by mole of neopentyl glycol were placed in an autoclave equipped with a stirrer and a distillation column, and manganese acetate as an interesterification catalyst was added thereto in an amount of 0.07% by weight based on the weight of dimethyl terephthalate. While removing methanol formed during the reaction, the temperature was raised to 220° C.

After the interesterification was complete, silicon dioxide having an average particle diameter of 0.28 μm as an antiblocking agent and trimethyl phosphate as a stabilizer were added in an amounts of 0.07% by weight and 0.4% by weight, respectively, based on the weight of dimethyl terephthalate.

After 5 minutes, antimonytrioxide and tetrabutylene titanate, as polymerization catalysts, were added in amounts of 0.035% by weight and 0.005% by weight, respectively, based on the weight of dimethyl terephthalate, then the whole was stirred for 10 minutes.

The resulting mixture was transferred to a second reactor equipped with a vacuum unit, and allowed to polymerize at 285° C. under reduced pressure for 210 minutes, to obtain 2,2-dimethyl-1,3-propanediol copolymerized polyester having an intrinsic viscosity of 0.68 dL/g. From the gas chromatography analysis to the obtained copolymer, it found that the obtained copolymer comprises the repeating unit derived from 2,2-dimethyl-1,3-propanediol in an amount of 20% by mole.

Preparation Example 2

Preparation of Polyethylene Terephthalate (Polymer B)

The procedure of Preparation Example 1 was repeated except for using 180 parts by mole of ethylene glycol, to obtain a polyethylene terephthalate having an intrinsic viscosity of 0.72 dL/g.

Preparation Example 3

Preparation of Polytrimethylene Terephthalate (Polymer C)

100 parts by mole of dimethyl terephthalate and 140 parts by mole of 1,3-propanediol were placed in an autoclave equipped with a stirrer and a distillation column, and tetrabutylene titanate as an interesterification catalyst was added thereto in an amount of 0.05% by weight based on the weight of dimethyl terephthalate. While removing methanol formed during the reaction, the temperature was raised to 220° C. After the interesterification was complete, trimethyl phosphate as a stabilizer was added in an amount of 0.045% by weight based on the weight of dimethyl terephthalate. After 10 minutes, antimonytrioxide as a polymerization catalyst was added in an amount of 0.02% by weight based on the weight of dimethyl terephthalate, and the resulting mixture was transferred to a second reactor equipped with a vacuum unit, and allowed to polymerize at 270° C. for about 180 min, to obtain polytrimethylene terephthalate having an intrinsic viscosity of 0.85 dL/g.

Examples 1 to 7 and Comparative Examples 1 to 5

The polymers A to C obtained in Preparation Examples 1 to 3 were mixed in various ratios as shown in Table 1, respectively, and each mixture was melted at 280° C., extruded through a T-die, and cooled by a casting roller, to obtain an undrawn sheet. In Examples 1 to 7, the each undrawn sheet was preheated to 75° C. using a heating roll, and drawn in the longitudinal direction using rolls having different peripheral velocities (the peripheral velocity ratio of the rear drawing roll to the forward drawing roll: 1.5-3.0) in 3 stages, to obtain a longitudinally directional shrinkable polyester film having a thickness of 50 μm.

In Comparative Examples 1 to 4, the each undrawn sheet was drawn in the transverse direction by a conventional method using a tenter, to obtain a transversely directional shrinkable polyester film.

In Comparative Example 5, the undrawn sheet was drawn in the longitudinal direction with 3.8 times using heating rolls having different peripheral velocities (the peripheral velocity ratio: 3.8), and drawn with 4.0 times in the transverse direction by a conventional method using a tenter, to obtain a bidirectionally shrinkable polyester film.

Polymer blending ratios (% by weight), contents of a repeating unit and drawing ratios, in the Examples 1 to 7 and Comparative Example 1 to 5, are shown in Table 1.

TABLE 1

| | Polymer bending ratio (% by weight) | | | Content of Repeating Units (% by mole) | | | Drawing ratio | |
|---|---|---|---|---|---|---|---|---|
| | A | B | C | NPG | PDO | EG | LD | TD |
| Example 1 | 100 | 0 | | 20 | | 80 | 1.5 | 1.0 |
| Example 2 | 100 | 0 | | 20 | | 80 | 1.9 | 1.0 |
| Example 3 | 100 | 0 | | 20 | | 80 | 2.1 | 1.0 |
| Example 4 | 100 | 0 | | 20 | | 80 | 3.0 | 1.0 |
| Example 5 | 70 | 30 | | 14 | | 86 | 3.0 | 1.0 |
| Example 6 | 30 | 70 | | 6 | | 94 | 3.0 | 1.0 |
| Example 7 | 60 | 20 | 20 | 14 | 14 | 72 | 3.0 | 1.0 |
| Comparative Example 1 | 100 | 0 | | 20 | | 80 | 1.0 | 3.0 |
| Comparative Example 2 | 70 | 30 | | 14 | | 86 | 1.0 | 3.0 |
| Comparative Example 3 | 30 | 70 | | 6 | | 94 | 1.0 | 3.0 |
| Comparative Example 4 | 0 | 100 | | 0 | | 100 | 1.0 | 3.0 |
| Comparative Example 5 | 100 | 0 | | 20 | | 80 | 3.8 | 4.0 | polymer A: copolymerized polyester of neopentyl glycol with ethylene glycol
polymer B: polyethylene terephthalate
polymer C: polytrimethylene terephthalate
EG: ethylene glycol,
NPG: neopentyl glycol,
PDO: propanediol
LD: longitudinal direction,
TD: transverse direction The heat-shrinkable polyester films obtained in Examples 1 to 7 and Comparative Examples 1 to 5 were evaluated for the following properties, and the results are shown in Table 2.

(1) Thermal Shrinkage Ratio

A film sample was cut into a 15 mm (width)×300 mm (length) piece to the direction to be measured, treated in 100° C. water for 10 seconds, and the length (L) of the piece was measured, to determine the thermal shrinkage ratio by the following formula:

Thermal shrinkage ratio (%)=[(300−$L$)/300]×100

(2) Tensile Strength

A film sample was cut into a 15 mm (width)×10 cm (length) piece, and the tensile strength of the piece at rupture was measured at room temperature using a tensile test apparatus (Model 6021, Instron Co., U.S.A.)

(3) Elongations at the Hardening and Yield Points

A film sample was cut into a 15 mm (width)×50 mm (length) piece, and the lengths (L) of the piece at the hardening and yield points in the longitudinal direction (primary shrinking direction) were measured, to determine the elongation by the following formula:

Elongation (%)=[($L$−50)/50]×100

(4) Crack Occurrence Ratio 330 mL glass bottles were wrapped with a film sample through a shrinking tunnel, and 24 such covered bottles were placed in a cardboard box in a 6 rows by 4 columns configuration at 5 mm intervals, and the box was sealed. Then, the box was vibrated horizontally for 30 minutes with a vibration-amplitude of 50 mm and a vibration-speed of 180 shuttles/min, and the crack occurrence ratio was evaluated by measuring the rupture defective proportion by visual inspection. The crack occurrence ratio (%) represents the percentage of the bottles having a rupture-length of 30 mm or more.

(5) Post-Processability

The labeled vessels were prepared using film rolls obtained in Examples 1 to 7 in accordance with the procedure in FIG. 3. In case of the films of Comparative Examples 1 to 3 which the procedure in FIG. 3 can not be applied, the labeled vessels were prepared in accordance with the procedure in FIG. 1. The post-processability was estimated as follows:
○ Good: The vessels of 500 or more per minute were treated.
X Poor: The vessels less than 500 per minute were treated.
(6) Driving Stability The film rolls obtained in Examples 1 to 7 and Comparative Examples 1 to 5 were placed in a conventional slitting machine and the winding and unwinding processes were repeated in 50 N of a winding force. The state of the film was observed each time and the driving stability of the film was evaluated as follows:
○ Good: The film strain and the breakage were not found;
Δ Decent: The film strain and the intermittent breakage were found; and
X Poor: The serious film strain and the frequent breakage were found.

TABLE 2

|  | Test (1) (%) | | Test (2) (kg/mm²) | | Test (3) (%) | | | Test (4) (%) | Test (5) | Test (6) |
| --- | --- | --- | --- | --- | --- | --- | --- | --- | --- | --- |
|  | LD | TD | LD | TD | HP | YP | D |  |  |  |
| Example 1 | 36 | −2 | 8.9 | 5.0 | 157 | 5 | 152 | 1.2 | ○ | ○ |
| Example 2 | 49 | −2 | 11.4 | 5.2 | 120 | 6 | 114 | 1.8 | ○ | ○ |
| Example 3 | 53 | −2 | 10.7 | 5.1 | 88 | 5 | 83 | 2.1 | ○ | ○ |
| Example 4 | 67 | −3 | 19.8 | 4.7 | 29 | 5 | 24 | 2.3 | ○ | ○ |
| Example 5 | 65 | −2 | 17.7 | 4.5 | 27 | 6 | 21 | 2.8 | ○ | ○ |
| Example 6 | 63 | −2 | 14.0 | 4.1 | 28 | 6 | 22 | 2.9 | ○ | ○ |
| Example 7 | 65 | −2 | 14.3 | 4.2 | 28 | 6 | 22 | 2.7 | ○ | ○ |
| Comparative Example 1 | 0 | 66 | 5.2 | 19.7 | 14 | 6 | 8 | 7.5 | X | X |
| Comparative Example 2 | 0 | 65 | 5.1 | 19.2 | 12 | 5 | 7 | 7.6 | X | X |
| Comparative Example 3 | 0 | 63 | 5.1 | 20.3 | 12 | 6 | 6 | 8.1 | X | X |
| Comparative Example 4 | 0 | 58 | 5.0 | 20.1 | 11 | 6 | 5 | 11.2 | X | X |
| Comparative Example 5 | 43 | 55 | 19.8 | 20.1 | 12 | 6 | 6 | 9.3 | X | ○ |

LD: longitudinal direction,
TD: transverse direction
HP: an elongation (%) at the hardening point
YP: an elongation (%) at the yield point
D: a difference between elongations (%) at the hardening and yield points As shown in Table 2, the films obtained in Examples 1 to 7 exhibit high tensile strengths of 7 kgf/mm² or more in the longitudinal direction, post-processing thereof was simplified, and the difference between the elongations at the hardening and yield points measured 15% or more, leading to low crack occurrence ratios after labeling process.

However, the transversely directional shrinkable films of Comparative Examples 1 to 4 and the bidirectionally shrinkable film of Comparative Examples 5, showed the difference between elongations at the hardening and yield points of less than 15%, leading to high crack occurrence ratios.

Figure 4:
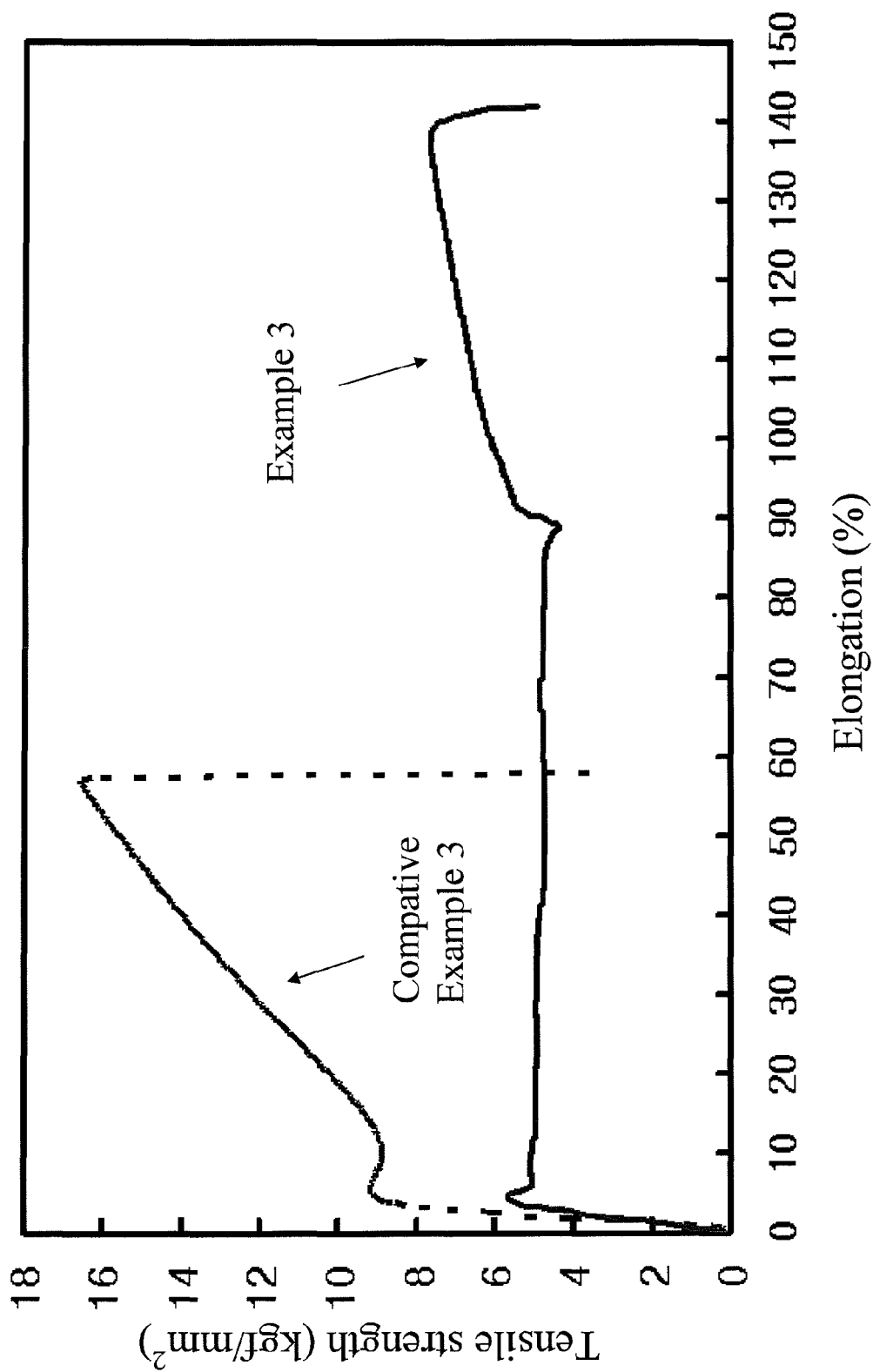
FIG. 4: a stress-strain curve showing the degree of elongation at hardening and the yield point of the films obtained in Example 3 and Comparative Example 3.

FIG. 4 is a stress-strain curve showing the degree of elongation at hardening and the yield point of the films obtained in Example 3 and Comparative Example 3. As shown in FIG. 4, elongations of the film of Comparative Example 3 at the hardening and yield points measured 6% and 12%, respectively, and the difference was only 6%. However, elongations of the film of Example 3 at the hardening and yield points measured 5% and 88%, respectively, and the difference was 83%.

According to the present invention, as a difference between elongations at hardening and yield points increases in a tension test on a film, the crack occurrence of the film during labeling process decreases. Specifically, when the difference is 15% or more, the film shows remarkably improved crack occurrence ratio.

While the invention has been described with respect to the above specific embodiments, it should be recognized that various modifications and changes may be made to the invention by those skilled in the art which also fall within the scope of the invention as defined by the appended claims.

What is claimed is:

1. A heat-shrinkable polyester film having a thermal shrinkage ratio of 15% or more in the longitudinal direction when treated at 100° C. for 10 seconds, a tensile strength at rupture in the longitudinal direction of 7 kgf/mm² or more, and a difference between elongations (%) at the hardening and yield points in the longitudinal direction of 15% or more.

2. The film of claim 1, which is a uni-directionally shrinkable film.

3. The film of claim 1, which is drawn in the longitudinal direction at a total drawing ratio of 1.2 to 7.

4. The film of claim 1, which is composed of a polyester resin which comprises
   60 to 97% by mole of ethylene terephthalate repeating unit; and
   3 to 40% by mole of a repeating unit obtained by copolymerization of a component selected from the group consisting of terephthalic acid, dimethyl terephthalate, naphthalenedicarboxylic acid and a mixture thereof with a branched alkylene glycol component having a carbon number of 3 or more.

5. The film of claim 4, wherein the polyester resin further comprises 20% or less by mole of a repeating unit obtained by copolymerization of a component selected from the group consisting of terephthalic acid, dimethyl terephthalate, naphthalenedicarboxylic acid and a mixture thereof with a linear alkylene glycol component having a carbon number of 3 or more.

6. The film of claim 5, wherein the linear alkylene glycol component is selected from the group consisting of 1,3-propanediol, 1,4-butanediol, 1,5-pentanediol and a mixture thereof.

7. The film of claim 4, wherein the branched alkylene glycol component is selected from the group consisting of 1,2-octanediol, 1,3-octanediol, 2,3-butanediol, 1,3-butanediol, 2,2-dimethyl-1,3-propanediol, 2-butyl-2-ethyl-1,3-propanediol, 2,2-diethyl-1,5-petanediol, 2,4-diethyl-1,5-pentanediol, 3-methyl-1,5-pentanediol, 1,1-dimethyl-1,5-pentanediol and a mixture thereof.

8. A method for preparing the heat-shrinkable polyester film according to claim 1, comprising the steps of:
   i) melt-extruding a polyester resin at 200 to 300° C.;
   ii) casting the extruded resin with cooling, to produce an undrawn sheet; and
   iii) drawing the undrawn sheet in the longitudinal direction at a total drawing ratio of 1.2 to 7.

9. The method of claim 8, wherein the drawing is conducted using at least two rolls having different peripheral velocities, the peripheral velocity ratio of the rear drawing roll to the front drawing roll being 1.1 to 6.5.

10. A wrapping material comprising the heat-shrinkable polyester film according to claim 1.

* * * * *